US012103029B2

(12) United States Patent
Terada et al.

(10) Patent No.: US 12,103,029 B2
(45) Date of Patent: Oct. 1, 2024

(54) PAINTING DEVICE WITH NON-CONTACT FLOWMETERS

(71) Applicant: ABB SCHWEIZ AG, Baden (CH)

(72) Inventors: Masaru Terada, Tokyo (JP); Takumi Ogawa, Tokyo (JP); Shinya Nomura, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 325 days.

(21) Appl. No.: 17/603,893

(22) PCT Filed: Jan. 30, 2020

(86) PCT No.: PCT/JP2020/003534
§ 371 (c)(1),
(2) Date: Oct. 14, 2021

(87) PCT Pub. No.: WO2021/152794
PCT Pub. Date: Aug. 5, 2021

(65) Prior Publication Data
US 2022/0193715 A1 Jun. 23, 2022

(51) Int. Cl.
*B05B 12/00* (2018.01)
*B05B 3/10* (2006.01)
(Continued)

(52) U.S. Cl.
CPC ........ *B05C 11/1002* (2013.01); *B05B 3/1014* (2013.01); *B05B 12/006* (2013.01);
(Continued)

(58) Field of Classification Search
None
See application file for complete search history.

(56) References Cited

U.S. PATENT DOCUMENTS

| | | | | |
|---|---|---|---|---|
| 9,393,586 | B2 | 7/2016 | Donner et al. | |
| 2001/0015222 | A1* | 8/2001 | Lewit | B32B 5/28 700/285 |

(Continued)

FOREIGN PATENT DOCUMENTS

| | | | |
|---|---|---|---|
| CN | 102272629 | A | 12/2011 |
| CN | 104772246 | A | 7/2015 |

(Continued)

OTHER PUBLICATIONS

Sensirion AG Switzerland; "Liquid Flow Meter LG16 / For Integration Into Instruments and Other Closed Systems"; LG16-Liquid Flow Meter; Sep. 17, 2021; 10 pages (with English Translation).

(Continued)

*Primary Examiner* — Binu Thomas
(74) *Attorney, Agent, or Firm* — Greenberg Traurig, LLP

(57) ABSTRACT

A painting device includes a paint output part for outputting paint toward an object to be painted; an introduction pipe through which the paint flows and which introduces the paint into the paint output part; flowmeters placed outside the introduction pipe and measuring the flow rate of the paint in the introduction pipe; and a determination unit for determining whether the condition of the paint is normal on the basis of the result of measurement by the flow meters. The flow meter can be placed between an air motor and a valve. The flow meters can be placed downstream and upstream of the valve, respectively. The flow meters can be placed downstream and upstream of a joint, respectively. The flow meters can be placed downstream and upstream of a pump, respectively.

12 Claims, 6 Drawing Sheets

(51) Int. Cl.
*B05B 12/08* (2006.01)
*B05B 12/14* (2006.01)
*B05C 11/10* (2006.01)

(52) U.S. Cl.
CPC ............ *B05B 12/008* (2013.01); *B05B 12/08* (2013.01); *B05B 12/149* (2013.01); *B05C 11/1013* (2013.01)

(56) References Cited

U.S. PATENT DOCUMENTS

| | | | | |
|---|---|---|---|---|
| 2011/0315889 | A1 | 12/2011 | Webster et al. | |
| 2012/0132672 | A1 * | 5/2012 | Van Dinter | B05B 7/0408 222/61 |
| 2013/0032213 | A1 | 2/2013 | Börner | |
| 2014/0138400 | A1 | 5/2014 | Donner et al. | |
| 2020/0049542 | A1 * | 2/2020 | Ramspeck | B05C 11/1013 |

FOREIGN PATENT DOCUMENTS

| | | | | | |
|---|---|---|---|---|---|
| CN | 104812500 | A | | 7/2015 | |
| CN | 107199135 | A | | 9/2017 | |
| CN | 108889491 | A | | 11/2018 | |
| CN | 209866391 | U | | 12/2019 | |
| DE | 102017129409 | A1 | | 6/2018 | |
| JP | S54-005488 | A | | 1/1979 | |
| JP | S63214429 | A | | 9/1988 | |
| JP | H10216605 | A | | 8/1998 | |
| JP | H10315349 | A | | 12/1998 | |
| JP | 2000135454 | A | * | 5/2000 | |
| JP | 2000202338 | A | | 7/2000 | |
| JP | 2001239190 | A | * | 9/2001 | B05B 3/1014 |
| JP | 2003001155 | A | | 1/2003 | |
| JP | 2004138627 | A | | 5/2004 | |
| JP | 2004344889 | A | | 12/2004 | |
| JP | 2008207120 | A | | 9/2008 | |
| JP | 2009190149 | A | | 8/2009 | |
| JP | 2009190353 | A | | 8/2009 | |
| JP | 2009195998 | A | | 9/2009 | |
| JP | 2011125787 | A | | 6/2011 | |
| JP | 2012061545 | A | | 3/2012 | |
| JP | 2012511712 | A | | 5/2012 | |
| JP | 2013238161 | A | | 11/2013 | |
| JP | 2015054311 | A | * | 3/2015 | |
| JP | 2016504181 | A | | 2/2016 | |
| JP | 2016217551 | A | | 12/2016 | |
| JP | 2017047522 | A | | 3/2017 | |
| JP | 2018094630 | A | | 6/2018 | |
| JP | 2018167338 | A | | 11/2018 | |
| JP | 2019005686 | A | | 1/2019 | |
| WO | 2008071273 | A2 | | 6/2008 | |
| WO | 2010067068 | A2 | | 6/2010 | |

OTHER PUBLICATIONS

International Search Report, issued by the Japan Patent Office, regarding corresponding patent application Serial No. PCT/JP2020/003534; Mar. 17, 2020, 8 pages (with English Translation).
"Modern Aerospace Telemetry Technology", li Yanhua, ed. p. 504, China Aerospace Press, Apr. 2018.
China First Office Action; issued by the China National Intellectual Property Administration; regarding corresponding patent application Serial No. CN 202080028487.8; dated Jul. 4, 2022; 24 pages (with English translation).
Japan Notification of Reasons for Refusal; issued by the Japanese Patent Office; regarding corresponding patent application Serial No. JP 2021-574382; dated Jun. 27, 2022;12 pages (with English translation).
China Supplementary Search; issued by the China National Intellectual Property Administration; regarding corresponding patent application Serial No. CN 202080028487.8; dated Jul. 6, 2022; 1 page.
"Practical Computer Control Technical Manual", Nov. 1994.

* cited by examiner the operation of CCV40 is normal the operation of CCV40 is abnormal

PAINTING DEVICE WITH NON-CONTACT FLOWMETERS

CROSS REFERENCE TO RELATED APPLICATIONS

This application is a U.S. National Phase of International patent application No.: PCT/JP2020/003534, filed Jan. 30, 2020, the disclosure of which is incorporated herein by reference in its entirety.

FIELD

The present invention relates to a coating device for coating an automobile body and the like.

BACKGROUND

Conventionally, there has been known a coating device that performs coating while changing the color of an automobile body and the like (for example, refer to the Abstract of Patent Document 1). In such a coating device, a pipe through which the paint passes is provided. Further, coating is performed assuming the flow rate of the paint.

REFERENCES

Patent Document 1: Japanese Unexamined Patent Application Publication No. 2004-344889

SUMMARY

Problems to be Solved

However, even if the flow rate of the paint is assumed, it may be different from the actual flow rate of the paint. In such a case, the flow rate of the paint may be abnormal, which may result in defects in the coating.

Therefore, the subject of the present invention is to determine whether the state (flow rate, etc.) of the paint in the coating device is normal.

Means used to Solve the Problems

The coating device in accordance with the present invention is configured to comprise: a paint output part outputting paint towards a coating object; a pipe for the paint to flow; flow meters being arranged outside of the pipe and measuring a flow rate of the paint in the pipe; and a determination part determining whether a state of the paint is normal based on a measurement result of the flow meter.

In accordance with the coating device configured as described above, the paint output part outputs the paint towards the coating object. The paint flows in the pipe. The flow meters are arranged outside of the pipe, and measure the flow rate of the paint in the pipe. The determination part determines whether the state of the paint is normal based on the measurement result of the flow meter.

In addition, it may be in the coating device in accordance with the present invention that, the pipe comprises an introduction pipe, the introduction pipe introducing the paint into inside of the paint output part.

In addition, it may be in the coating device in accordance with the present invention that, the paint output part comprises: an air motor being connected to the introduction pipe and rotated by air; and a valve being connected to the introduction pipe and switching whether to supply the paint to the air motor, the flow meter is arranged outside of the introduction pipe and are arranged between the air motor and the valve, and the determination part determines whether the flow rate of the paint is normal.

In addition, it may be in the coating device in accordance with the present invention that, the flow meters are arranged at the upstream side and the downstream side of a connection element connected to the introduction pipe, and are arranged outside of the introduction pipe, and the determination part determines whether the flow rate of the paint is normal based on a comparison result of a measurement result of a flow meter arranged at the upstream side and a measurement result of a flow meter arranged at the downstream side.

In addition, it may be in the coating device in accordance with the present invention that, the coating device is provided with an air motor, the air motor being connected to the introduction pipe and rotated by air, and the connection element is a valve that switches whether to supply the paint to the air motor.

In addition, it may be in the coating device in accordance with the present invention that, the connection element is a joint that joins the introduction pipe and the paint output part.

In addition, it may be in the coating device in accordance with the present invention that, the connection element is a pump that sends out the paint to the paint output part.

In addition, it may be in the coating device in accordance with the present invention that, the pipe comprises a connection pipe, the connection pipe being connected to the introduction pipe via a color change valve and is provided per color of the paint.

In addition, it may be in the coating device in accordance with the present invention that, the flow meters are arranged at the upstream side and the downstream side of a connection element connected to the connection pipe, and are arranged outside of the connection pipe, and the determination part determines whether the flow rate of the paint is normal based on one or both of a measurement result of a flow meter arranged at the upstream side and a measurement result of a flow meter arranged at the downstream side.

In addition, it may be in the coating device in accordance with the present invention that, the connecting element is the color change valve.

In addition, it may be in the coating device in accordance with the present invention that, the paint is a main agent, a curing agent, and a mixture of the main agent and the curing agent, the pipe comprises: an introduction pipe introducing the paint into inside of the paint output part; a main agent pipe for the main agent to flow; and a curing agent pipe for the curing agent to flow, wherein the introduction pipe, the main agent pipe, and the curing agent pipe are connected, and the flow meters comprise: a flow meter arranged outside of the main agent pipe and a flow meter arranged outside of the curing agent pipe.

In addition, it may be in the coating device in accordance with the present invention that, the determination part determines whether a mixing ratio of the main agent and the curing agent in the paint is normal based on a measurement result of the flow meter arranged outside of the main agent pipe and a measurement result of the flow meter arranged outside of the curing agent pipe.

In addition, it may be in the coating device in accordance with the present invention that, the flow meters detect a flow direction of the paint.

In addition, it may be in the coating device in accordance with the present invention that, the determination part determines whether the flow rate of the paint is normal based on a comparison result of a measurement result of the flow meter arranged outside of the main agent pipe and a set value of the flow rate of the paint in the main agent pipe.

In addition, it may be in the coating device in accordance with the present invention that, the determination part determines whether the flow rate of the paint is normal based on a comparison result of a measurement result of the flow meter arranged outside of the curing agent pipe and a set value of the flow rate of the paint in the curing agent pipe.

DETAILED DESCRIPTION OF EMBODIMENTS

Hereinafter, implementations of the present invention will be described with reference to the drawings.

First Implementation

Figure 1:
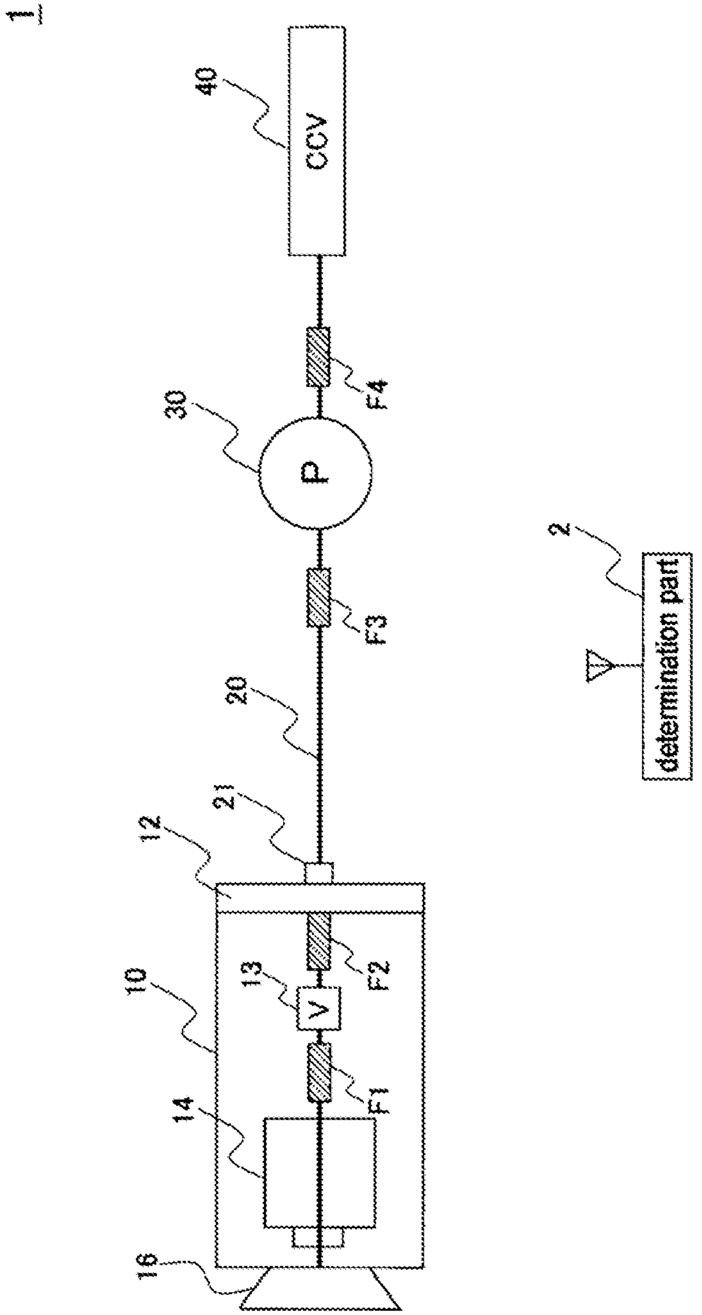
FIG. 1 is a front cross-sectional view of the coating device 1 in accordance with the first implementation of the present invention.

FIG. 1 is a front cross-sectional view of the coating device 1 in accordance with the first implementation of the present invention. The coating device 1 in accordance with the first implementation has a determination part 2, a paint output part 10, a pipe (introduction pipe 20), a joint 21, a pump 30, a color change valve (CCV) 40, flow meters F1, F2, F3, F4.

The paint output part 10 outputs paint toward the coating object. The coating object is, for example, the body of an automobile. The paint output part 10 has a rear plate 12, a valve 13, an air motor 14, and a bell cup 16.

The rear plate 12 is a plate arranged behind the paint output part 10 (on the opposite side to the bell cup 16). The air motor 14 rotates at a high speed (for example, 3000 rpm-150000 rpm) using compressed air, thereby rotating the bell cup 16. In addition, the paint introduced into the paint output part 10 from the introduction pipe 20 passes through the rear plate 12 and the valve 13, and is supplied to the bell cup 16 along the rotation axis of the air motor 14. The bell cup 16 rotates at a high speed to make the supplied paint atomize. The atomized paint is coated toward the coating object.

The valve 13 is a valve for switching whether to supply the paint introduced into the paint output part 10 from the introduction pipe 20 to the air motor 14.

The paint flows through the pipe (introduction pipe 20). The introduction pipe 20 is a pipe that introduces paint into the inside of the paint output part 10, and is, for example, a resin pipe. In addition, the valve 13, the air motor 14, the joint 21 and the pump 30 are connected to the introduction pipe 20.

The color change valve 40 is a valve that selects any one of a plurality of colors of paint and flows it into the introduction pipe 20.

The flow meters F1, F2, F3, and F4 are arranged outside of the pipe (introduction pipe 20) (for example, externally connected to the pipe). The flow meters F1, F2, F3, F4, for example, irradiate the paint in the pipe with laser light, and measure the flow velocity of the paint in the pipe based on the frequency change of the reflected substance (Doppler Effect), and then measure the flow rate. In addition, ultrasonic waves may be used instead of laser light.

Based on the measurement results of the flow meters F1, F2, F3, F4, the determination part 2 determines whether the state of the paint is normal. In addition, the determination part 2 receives the measurement results of the flow meters F1 to F4 from the flow meters through wireless communication. However, also, the determination part 2 may be connected to the flow meters F1 to F4 through a communication cable, and the determination part 2 may receive the measurement result from the flow meters through wired communication.

The flow meter F1 is arranged outside of the introduction pipe 20 (for example, externally connected to the introduction pipe 20), and is arranged between the air motor 14 and the valve 13. The determination part 2 determines whether the flow rate of the paint is normal based on the measurement result of the flow meter F1.

Figure 2:
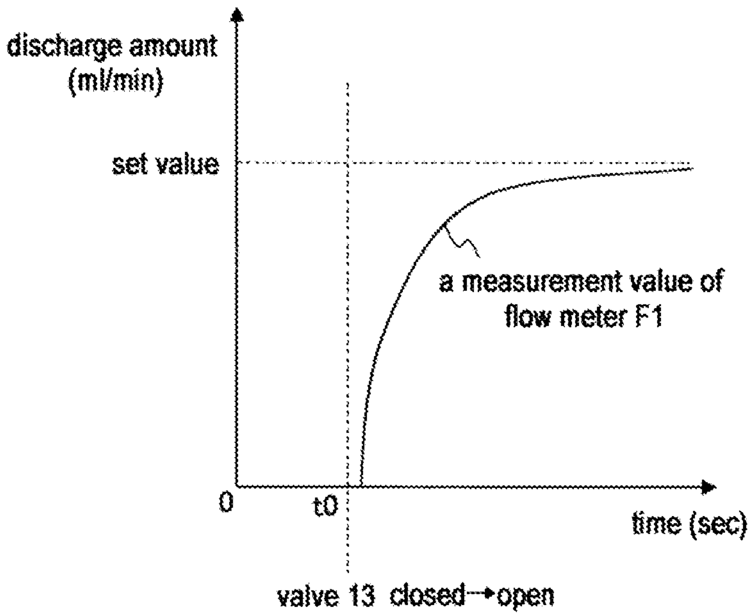
FIG. 2 is a diagram showing the measurement result of the flow meter F1 (solid line) and the set value of discharge amount of the paint of the coating device 1 (dashed line).

FIG. 2 is a diagram showing the measurement result of the flow meter F1 (solid line) and the set value of discharge amount of the paint of the coating device 1 (dashed line). However, in FIG. 2, the unit of discharge amount of the paint is ml/min, and the unit of time is second. When a little time elapses from the time t0 when the valve 13 is opened, the paint starts to flow to the position of the introduction pipe 20 where the flow meter F1 is arranged, and the flow rate approaches the set value (refer to the measurement result of the flow meter F1 (solid line)). Therefore, after a certain time has passed from time t0 or the measurement result of the flow meter F1 (solid line) becoming almost constant, the set value is compared with the measurement result. If the measurement result is within a specified range from the set value (for example, within ±5% of the set value), it is determined that the flow is normal. In addition, it is sufficient if the determination part 2 performs the above-mentioned determination, and the coating device 1 only needs to include the flow meter F1, and it does not need to include the flow meter F2, the flow meter F3, and the flow meter F4.

Figure 6:
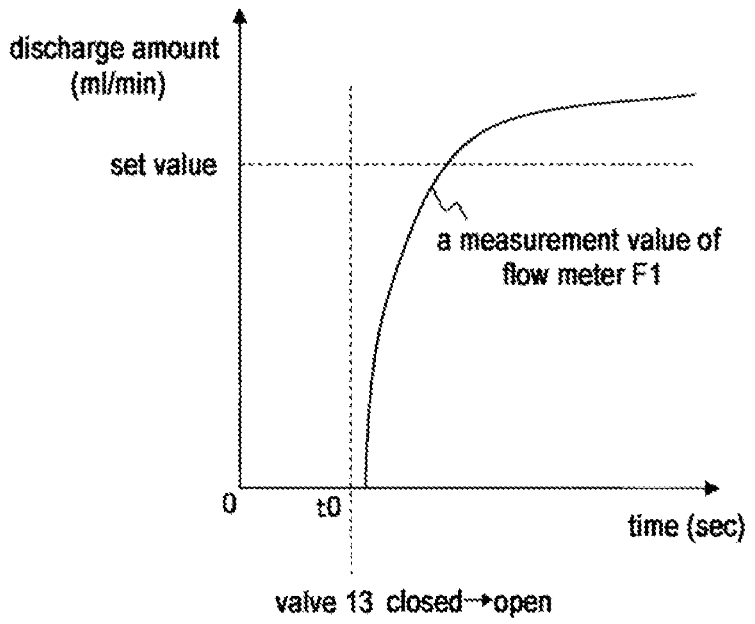
FIG. 6 is a diagram showing the measurement result of the flow meter F1 (solid line) and the set value of discharge amount of the paint of the coating device 1 (dashed line) when the leakage amount of the pump 30 is large in the first implementation of the present invention.

FIG. 6 is a diagram showing the measurement result of the flow meter F1 (solid line) and the set value of discharge amount of the paint of the coating device 1 (dashed line) when the leakage amount of the pump 30 is large in the first implementation of the present invention. When the pump 30 is a gear pump, the paint leaks (spills) from the pump 30 due to wear of one or both of the gear and the gear box, and the flow rate may exceed the set value (for example, the measurement result indicates that the set value exceeds the set value by 10-20%). In this case, the determination part 2 determines that the flow rate is abnormal. In addition, also, the coating device 1 may include an alarm part, and the alarm part may issue an alarm urging replacement of the pump 30 in this case.

Here, if the connection element is defined as an element connected to the introduction pipe 20, the valve 13, the joint 21, and the pump 30 are the connection elements. The joint 21 joins the introduction pipe 20 and the paint output part 10. The pump 30 sends the paint from the color change valve (CCV) 40 to the paint output part 10.

The flow meters F1, F2, F3, F4 are arranged at the upstream and downstream sides of the connection elements (valve 13, joint 21, and pump 30), and are arranged outside of the introduction pipe 20 (for example, externally connected to the introduction pipe 20). In addition, the paint flows from the upstream side to the downstream side. The connection elements are arranged in order from the downstream side as the valve 13, the joint 21, and the pump 30. In addition, an air motor 14 is arranged at the downstream side of the valve 13, and a color change valve 40 is arranged at the upstream side of the pump 30.

In addition, the flow meter F2 is arranged between the valve 13 and the joint 21. The flow meter F3 is arranged between the joint 21 and the pump 30. The flow meter F4 is arranged between the pump 30 and the color change valve 40.

That is, the flow meter F2 and the flow meter F1 are arranged at the upstream side and the downstream side of the valve 13, respectively. A flow meter F3 and a flow meter F2 are arranged at the upstream side and the downstream side of the joint 21, respectively. A flow meter F4 and a flow meter F3 are respectively arranged at the upstream side and the downstream side of the pump 30.

The determination part 2 determines whether the flow rate of the paint is normal based on the comparison result of the measurement result of the flow meter arranged at the upstream side and the measurement result of the flow meter arranged at the downstream side.

For example, the measurement result of the flow meter F2 is compared with the measurement result of the flow meter F1. If the measurement result of the flow meter F1 is within the specified range of the measurement result of the flow meter F2 (for example, within ±5% of the measurement result of the flow meter F2), it is determined that the flow rate is normal. If the measurement result of the flow meter F1 is lower than the measurement result of the flow meter F2 by more than 5%, it is considered that paint leakage has occurred in the valve 13. In addition, it is sufficient if the determination part 2 performs the above-mentioned determination, and the coating device 1 only needs to include the flow meter F1 and the flow meter F2, and may not include the flow meter F3 and the flow meter F4.

For example, the measurement result of the flow meter F3 is compared with the measurement result of the flow meter F2. If the measurement result of the flow meter F2 is within the specified range from the measurement result of the flow meter F3 (for example, within ±5% of the measurement result of the flow meter F3), the flow rate is determined to be normal. If the measurement result of the flow meter F2 is lower than the measurement result of the flow meter F3 by more than 5%, it is considered that paint leakage has occurred in the joint 21. In addition, it is sufficient if the determination part 2 performs the above-mentioned determination, and the coating device 1 only needs to include the flow meter F2 and the flow meter F3, and may not include the flow meter F1 and the flow meter F4.

For example, the measurement result of the flow meter F4 is compared with the measurement result of the flow meter F3. If the measurement result of the flow meter F3 is within the specified range from the measurement result of the flow meter F4 (for example, within ±5% from the measurement result of the flow meter F4), it is determined that the flow rate is normal. If the measurement result of the flow meter F3 is lower than the measurement result of the flow meter F4 by more than 5%, it is considered that paint leakage has occurred in the pump 30. In addition, it is sufficient if the determination part 2 performs the above-mentioned determination, and the coating device 1 only needs to include the flow meter F3 and the flow meter F4, and may not include the flow meter F1 and the flow meter F2.

Next, the operation of the first implementation will be described.

By opening the color change valve 40 and operating the pump 30, the paint is sent from the color change valve 40 to the paint output part 10. The paint flows through the introduction pipe 20.

The measurement results of the flow meter F4 and the flow meter F3 are sent to the determination part 2. The determination part 2 determines whether the paint leakage has occurred in the pump 30. The measurement results of the flow meter F3 and the flow meter F2 are sent to the determination part 2. The determination part 2 determines whether the paint leakage has occurred in the joint 21. The measurement results of the flow meter F2 and the flow meter F1 are sent to the determination part 2. The determination part 2 determines whether the paint leakage has occurred in the valve 13. In addition, the determination part 2 determines whether the flow rate of the paint is normal based on the measurement result of the flow meter F1.

According to the first implementation, it can be determined whether the state of the paint in the coating device 1 (the flow rate of the introduction pipe 20) is normal.

Second Implementation

The coating device 1 in accordance with the second implementation is different from the first implementation in the following aspects: the connection element is changed to the color change valve 40 instead of the valve 13, the joint 21, and the pump 30, and flow meters FP1*a*-FP6*a* and FP1*b*-FP6*b* are respectively arranged at the upstream side and downstream side of the color change valve (connection element) 40.

Figure 3:
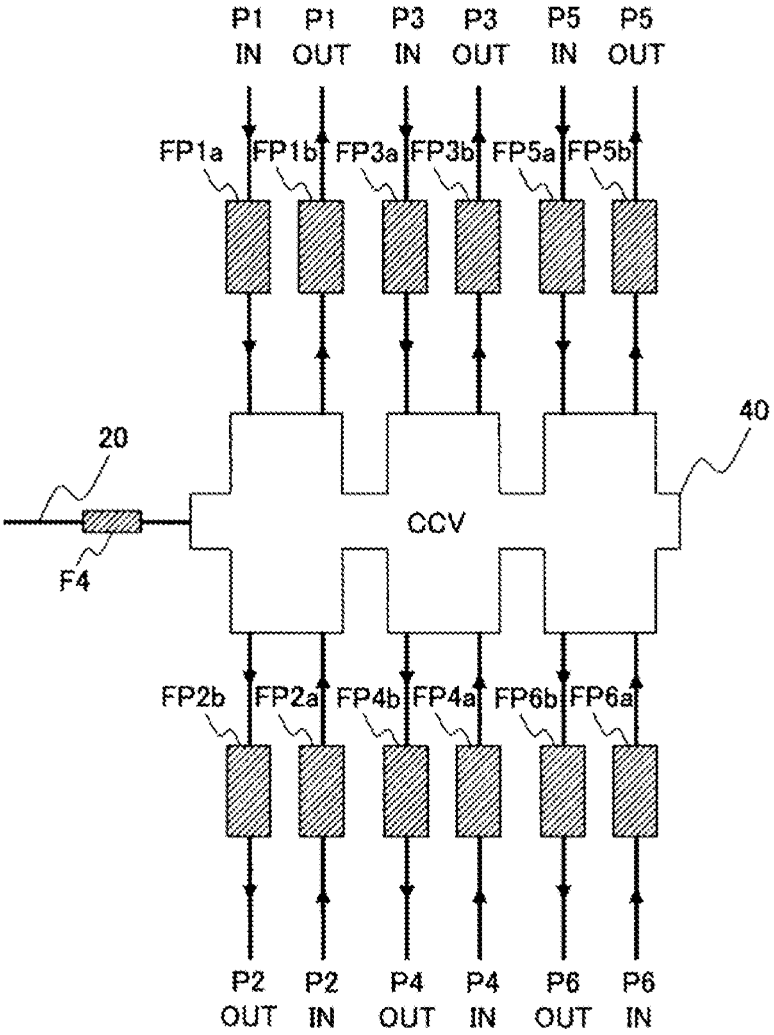
FIG. 3 is an enlarged view of the vicinity of the color change valve 40 of the coating device 1 in accordance with the second implementation.

FIG. 3 is an enlarged view of the vicinity of the color change valve 40 of the coating device 1 in accordance with the second implementation. The coating device 1 in accordance with the second implementation includes a determination part 2, a paint output part 10, a pipe (introduction pipe 20 (refer to FIG. 1) and connection pipes P1IN, P1OUT-P6IN, P6OUT (refer to FIG. 3)), joint 21, pump 30, color change valve (CCV) 40, flow meters F1, F2, F3, F4 (refer to FIG. 1), flow meters FP1*a*, FP1*b*-FP6*a*, FP6*b* (refer to FIG. 3). Hereinafter, the same reference numerals are given to the same parts as those of the first implementation, and descriptions thereof are omitted.

The paint output part 10, the introduction pipe 20, the joint 21, the pump 30, the color change valve (CCV) 40, the flow meters F1, F2, F3, F4 are the same as in the first implementation, and the descriptions are omitted.

The paint flows through the pipes (the introduction pipe 20 and the connection pipes P1IN, P1OUT-P6IN, P6OUT).

The connection pipes P1IN, P1OUT, P2IN, P2OUT, P3IN, P3OUT, P4IN, P4OUT, P5IN, P5OUT, P6IN, and P6OUT are connected to the introduction pipe 20 via the color change valve 40, and are provided per color of the paint.

That is, the connection pipes P1IN and P1OUT are pipes for paint of color P1 to flow in and out. When the color change valve 40 is closed, the paint of the color P1 flows in from the connection pipe P1IN, and flows out to the connection pipe P1OUT via the color change valve 40. When the color change valve 40 is open, the paint of the color P1 flows in from the connection pipe P1IN, and flows out to the introduction pipe 20 via the color change valve 40, but does not flow out to the connection pipe P1OUT.

In addition, the connection pipes P2IN and P2OUT are pipes for paint of color P2 to flow in and out, connection pipes P3IN and P3OUT are pipes for paint of color P3 to flow in and out, and connection pipes P4IN and P4OUT are pipes for paint of color P4 to flow in and out, the connection pipes P5IN and PSOUT are pipes for paint of color P5 to flow in and out, and the connection pipes P6IN and P6OUT are pipes for paint of color P6 to flow in and out. When the color change valve 40 is closed and when the color change valve 40 is opened, the way of inflow and outflow of the paint is the same as the connection pipes P1IN and P1OUT (however, the color of the paint is different). However, the above is an example of 6 colors, but cases other than 6 colors are also considered.

The flow meters FP1*a*, FP1*b*-FP6*a*, FP6*b* are arranged outside of the pipes (the connection pipes P1IN, P1OUT-P6IN, P6OUT) (for example, externally connected to the pipes). The flow meters FP1*a*, FP1*b*-FP6*a*, FP6*b* for example irradiate the paint within the pipes with laser light, and measure the flow velocity of the paint in the pipes based on the frequency change of the reflected substance (Doppler Effect), and then measure the flow rate. In addition, ultrasonic waves may be used instead of the laser light.

The flow meter FP1*a* is arranged outside of the connection pipe P1IN (for example, externally connected to the connection pipe P1IN). The flow meter FP1*b* is arranged outside of the connection pipe P1OUT (for example, externally connected to the connection pipe P1OUT).

The flow meter FP2*a* is arranged outside of the connection pipe P2IN (for example, externally connected to the connection pipe P2IN). The flow meter FP2*b* is arranged outside of the connection pipe P2OUT (for example, externally connected to the connection pipe P2OUT).

The flow meter FP3*a* is arranged outside of the connection pipe P3IN (for example, externally connected to the connection pipe P3IN). The flow meter FP3*b* is arranged outside of the connection pipe P3OUT (for example, externally connected to the connection pipe P3OUT).

The flow meter FP4*a* is arranged outside of the connection pipe P4IN (for example, externally connected to the connection pipe P4IN). The flow meter FP4*b* is arranged outside of the connection pipe P4OUT (for example, externally connected to the connection pipe P4OUT).

The flow meter FP5*a* is arranged outside of the connection pipe P5IN (for example, externally connected to the connection pipe P5IN). The flow meter FP5*b* is arranged outside of the connection pipe P5OUT (for example, externally connected to the connection pipe P5OUT).

The flow meter FP6*a* is arranged outside of the connection pipe P6IN (for example, externally connected to the connection pipe P6IN). The flow meter FP6*b* is arranged outside of the connection pipe P6OUT (for example, externally connected to the connection pipe P6OUT).

Here, if the connection element is defined as the element connected to the connection pipes P1IN, P1OUT-P6IN, and P6OUT, the color change valve (CCV) 40 is the connection element. In this way, the flow meters FP1*a*, FP1*b* are arranged at the upstream side and the downstream side of the color change valve (CCV) 40, respectively. The flow meters FP2*a*, FP2*b* are arranged at the upstream side and the downstream side of the color change valve (CCV) 40, respectively. The flow meters FP3*a*, FP3*b* are arranged at the upstream side and the downstream side of the color change valve (CCV) 40, respectively. The flow meters FP4*a*, FP4*b* are arranged at the upstream side and the downstream side of the color change valve (CCV) 40, respectively. The flow meters FP5*a*, FP5*b* are arranged at the upstream side and the downstream side of the color change valve (CCV) 40, respectively. The flow meters FP6*a*, FP6*b* are arranged at the upstream side and the downstream side of the color change valve (CCV) 40, respectively.

The determination part 2 determines whether the flow rate of the paint is normal based on one or both of the measurement result of the flow meter arranged at the upstream side and the measurement result of the flow meter arranged at the downstream side.

That is, the determination part 2 determines whether the state of the paint is normal based on the measurement results of the flow meters FP1*a*, FP1*b*-FP6*a*, FP6*b*. In addition, the determination part 2 receives the measurement results of the flow meters FP1*a*, FP1*b*-FP6*a*, FP6*b* from the flow meters through wireless communication. However, also, the determination part 2 may be connected to the flow meters FP1*a*, FP1*b*-FP6*a*, FP6*b* through communication cables, and the determination part 2 may receive the measurement results from the flow meters through wired communication.

Figure 4:
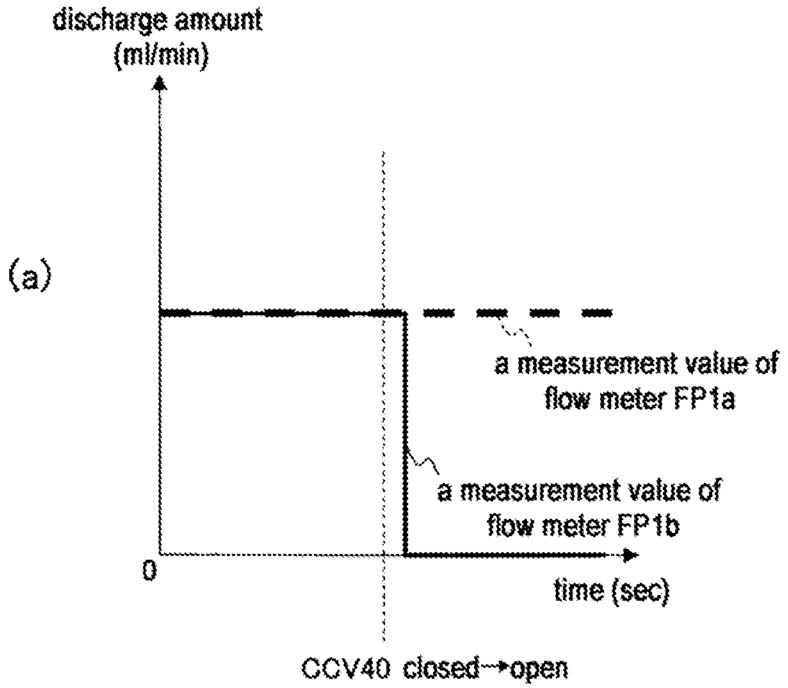
FIG. 4 is diagrams showing the measurement result of the flow meter FP1*a* (dashed line) and the measurement result of the flow meter FP1*b* (solid line) when the operation of the color change valve (CCV) 40 is normal (FIG. 4(*a*)) and when the operation of the color change valve (CCV) 40 is abnormal (FIG. 4(*b*)).
Figure 4:
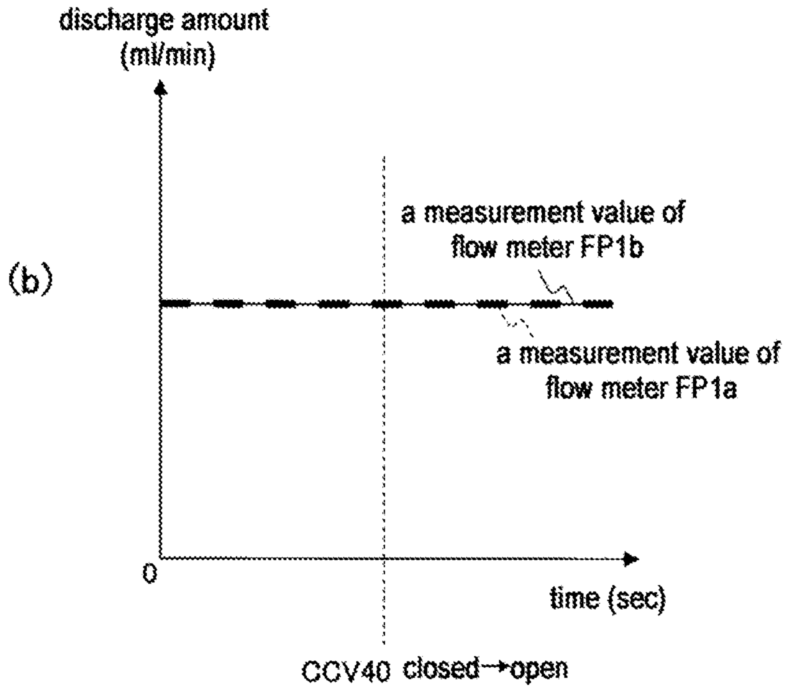

FIG. 4 is diagrams showing the measurement result of the flow meter FP1*a* (dashed line) and the measurement result of the flow meter FP1*b* (solid line) when the operation of the color change valve (CCV) 40 is normal (FIG. 4(*a*)) and when the operation of the color change valve (CCV) 40 is abnormal (FIG. 4(*b*)). However, in FIG. 4, the unit of discharge amount of the paint is ml/min, and the unit of time is second.

When the operation of the color change valve (CCV) 40 is normal, refer to FIG. 4(*a*), during the closing of the color change valve 40, the measurement result of the flow meter FP1*a* (dashed line) and the measurement result of the flow meter FP1*b* (solid line) are the same values. However, if a little time has passed since the color change valve 40 was opened, the measurement result of the flow meter FP1*b* (solid line) becomes zero.

When the operation of the color change valve (CCV) 40 is abnormal (for example, when the color change valve 40 remains closed and is not opened), refer to FIG. 4(*b*), even if the color change valve 40 is opened (more accurately, even if the control signal for opening is sent to the color change valve 40), the measurement result of the flow meter FP1*b* (solid line) remains the same value as the measurement result of the flow meter FP1*a* (dashed line).

Therefore, when the color change valve 40 remains closed and is not opened, based on the measurement result of the flow meter FP1*b*, or the comparison of the measurement result of the flow meter FP1*b* with the measurement result of the flow meter FP1*a*, it is possible to determine the abnormality of the color change valve 40 (and thereby the abnormality of the flow rate of the paint).

In addition, if the color change valve 40 originally has an abnormality before it was opened, the measurement result of the flow meter FP1*a* (dashed line) takes an abnormal value. Therefore, if there is an abnormality in the color change valve 40 before it was opened, it is possible to determine the abnormality of the color change valve 40 (and thereby the abnormality of the flow rate of the paint) based on the measurement result of the flow meter FP1*a*.

In addition, if the color change valve 40 originally has an abnormality before it was opened, the measurement result of the flow meter FP1*b* (solid line) takes an abnormal value. Therefore, if there is an abnormality in the color change valve 40 before it was opened, it is possible to determine the abnormality of the color change valve 40 (and thereby the abnormality of the flow rate of the paint) based on the measurement result of the flow meter FP1*b*.

In addition, based on the measurement results of the flow meters FP2*a,* FP2*b,* the measurement results of the flow meters FP3*a,* FP3*b,* the measurement results of the flow meters FP4*a,* FP4*b,* the measurement results of the flow meters FP5*a,* FP5*b,* and the measurement results of the flow meters FP6*a,* FP6*b* are all the same as the above, and it is possible to determine the abnormality of the color change valve 40 (and thereby the abnormality of the flow rate of the paint).

Next, the operation of the second implementation will be described.

The color change valve 40 is closed, but the part connected to the connection pipes (for example, P1IN and P1OUT) is opened. In this way, the paint of color P1 flows out to the introduction pipe 20. In this way, the measurement results of the flow meter FP1*a* and the flow meter FP1*b* are sent to the determination part 2. The determination part 2 determines the abnormality of the color change valve 40 (and thereby the abnormality of the flow rate of the paint).

According to the second implementation, it can be determined whether the state of the paint in the coating device 1 (the flow rate of the connection pipes P1IN, P1OUT-P6IN, P6OUT) is normal.

Third Implementation

The coating device 1 in accordance with the third implementation is different from the first implementation in measuring the flow rate of the main agent pipe 20*m* and the curing agent pipe 20*h*.

Figure 5:
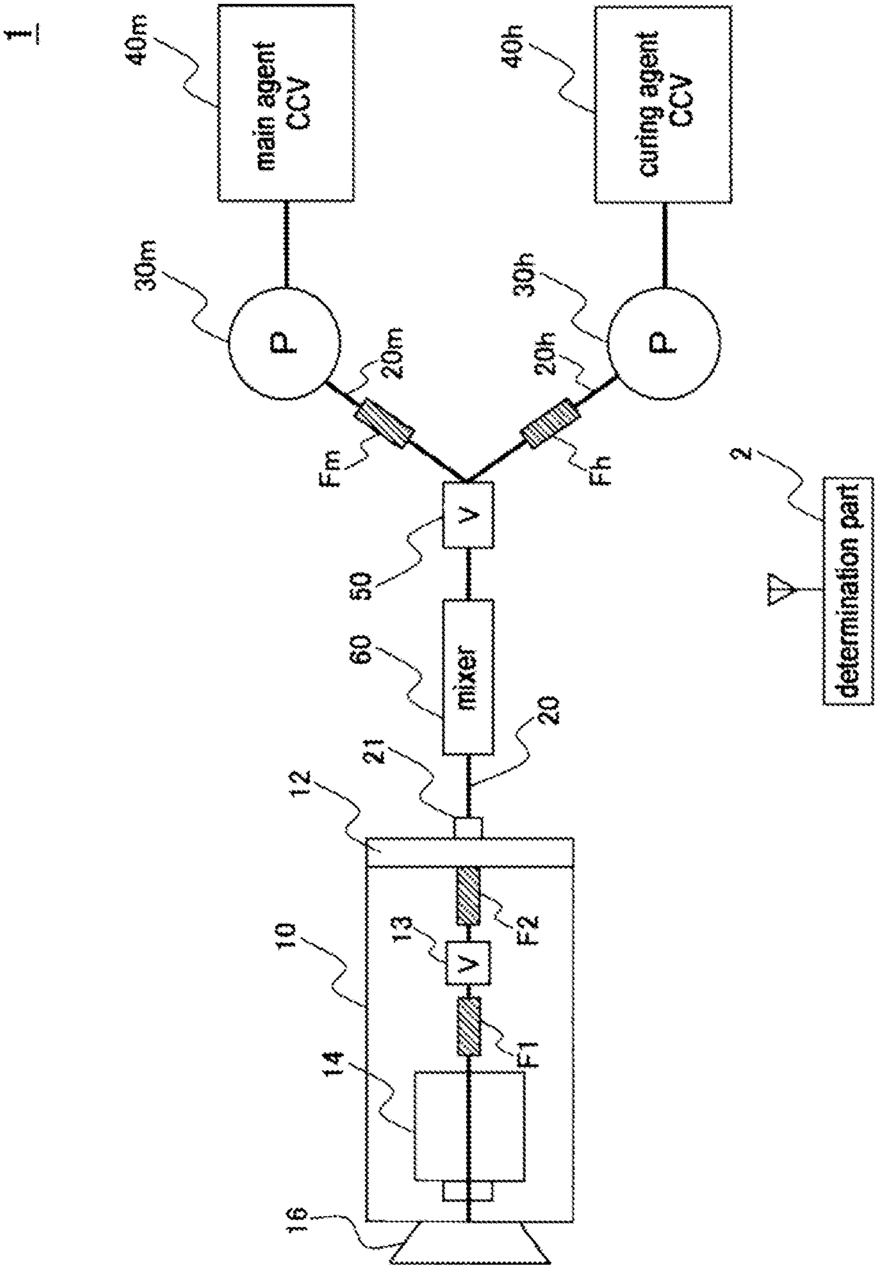
FIG. 5 is a front cross-sectional view of the coating device 1 in accordance with the third implementation of the present invention.

FIG. 5 is a front cross-sectional view of the coating device 1 in accordance with the third implementation of the present invention. The coating device 1 in accordance with the third implementation includes a determination part 2, a paint output part 10, pipes (introduction pipe 20, main agent pipe 20*m,* and curing agent pipe 20*h*), a joint 21, a main agent pump 30*m,* and a curing agent pump 30*h,* a main agent color change valve 40*m,* a curing agent color change valve 40*h,* a valve 50, a mixer 60, flow meters F1, F2, flow meters Fm, Fh. Hereinafter, the same reference numerals are given to the same parts as those of the first implementation, and descriptions thereof are omitted.

The paint output part 10, the introduction pipe 20, the joint 21, and the flow meters F1, F2 are the same as those in the first implementation, thus the description is omitted. However, the paint flowing in the introduction pipe 20 is a mixture of the main agent and the curing agent.

The main agent color change valve 40*m* is a valve that selects any one of a plurality of colors of paint (the main agent) and makes it flow through the main agent pipe 20*m.* The curing agent color change valve 40*h* is a valve that selects any one of a plurality of colors of paint (the curing agent) and makes it flow through the curing agent pipe 20*h.*

The main agent pipe 20*m* is a pipe for the main agent to flow. The curing agent pipe 20*h* is a pipe for the curing agent to flow.

The main agent pump 30*m* is connected to the main agent pipe 20*m,* and the paint is sent from the main agent color change valve 40*m* to the valve 50. The curing agent pump 30*h* is connected to the curing agent pipe 20*h,* and sends paint from the curing agent color change valve 40*h* to the valve 50.

The valve 50 is a valve provided at a location where the introduction pipe 20, the main agent pipe 20*m,* and the curing agent pipe 20*h* are connected.

The mixer 60 is arranged between the valve 50 and the joint 21 and is connected to the introduction pipe 20 to mix the main agent and the curing agent.

The flow meter Fm is arranged outside of the main agent pipe 20*m* (for example, externally connected to the pipe). The flow meter Fm for example irradiates the paint in the pipe with laser light, and measures the flow velocity of the paint in the main agent pipe 20*m* based on the frequency change of the reflected substance (Doppler Effect), and then measures the flux. In addition, ultrasonic waves may be used instead of the laser light. In addition, also, the flow meter Fm may be capable of detecting the flow direction of the paint in the main agent pipe 20*m.*

The flow meter Fh is arranged outside of the curing agent pipe 20*h* (for example, externally connected to the pipe). The flow meter Fh for example irradiates the paint in the pipe with laser light, and measures the flow velocity of the paint in the curing agent pipe 20*h* based on the change in the frequency of the reflected substance (Doppler Effect), and then measures the flow rate. In addition, ultrasonic waves may be used instead of the laser light. In addition, the flow meter Fh may be capable of detecting the flow direction of the paint in the curing agent pipe 20*h.*

The determination unit 2 determines whether the mixing ratio of the main agent and the curing agent of the paint is normal based on the measurement result of the flow meter Fm arranged outside of the main agent pipe 20*m* and the measurement result of the flow meter Fh arranged outside of the curing agent pipe 20*h.* In addition, the determination part 2 receives the measurement results of the flow meter Fm and the flow meter Fh from the flow meters through wireless communication. However, the determination part 2 may be connected to the flow meter Fm and the flow meter Fh through a communication cable, and the determination part 2 may receive the measurement result from the flow meters through wired communication.

In addition, the determination part 2 determines whether the state of the paint is normal based on the comparison result of the measurement result of the flow meter Fm arranged outside of the main agent pipe 20*m* and the set value of the flow rate of the paint in the main agent pipe 20*m.* For example, the set value is compared with the measurement result, if the measurement result is within a specified range from the set value (for example, within ±5% of the set value), it is determined that the flow rate is normal.

In addition, the determination part 2 determines whether the state of the paint is normal based on the comparison result of the measurement result of the flow meter Fh arranged outside of the curing agent pipe 20*h* and the set value of the flow rate of the paint in the curing agent pipe 20*h.* For example, the set value is compared with the measurement result, if the measurement result is within a specified range of the set value (for example, within ±5% of the set value), it is determined that the flow rate is normal.

Next, the operation of the third implementation will be described.

By opening the main agent color change valve 40*m* and operating the main agent pump 30*m,* the paint (main agent)

is sent from the main agent color change valve 40*m* to the valve 50. The paint flows through the main agent pipe 20*m*.

By opening the curing agent color change valve 40*h* and operating the curing agent pump 30*h*, the paint (curing agent) is sent from the curing agent color change valve 40*h* to the valve 50. The paint flows in the curing agent pipe for 20 hours.

When the valve 50 is opened, the main agent and the curing agent flow through the introduction pipe 20, are mixed by the mixer 60, and are supplied to the paint output part 10.

The measurement results of the flow meter Fm and the flow meter Fh are sent to the determination part 2. The determination part 2 determines whether the state of the paint is normal based on one or both of the measurement result of the flow meter Fm and the measurement result of the flow meter Fh.

According to the third implementation, it can be determined whether the state of the paint (one or both of the main agent and the curing agent) of the coating device 1 is normal.

In addition, the coating device 1 of the implementation of the present invention is a rotary atomization type coating machine, but it may be an air atomization type coating machine or a box coating machine.

DESCRIPTION OF REFERENCE SIGNS

1 . . . coating device; 2 . . . determination part; 10 . . . paint output part; 12 . . . rear plate; 13 . . . valve; 14 . . . air motor; 16 . . . bell cup; 20 . . . introduction pipe; P1IN, P1OUT-P6IN, P6OUT . . . connection pipes; 20*m* . . . main agent pipe; 20*h* . . . curing agent pipe; 21 . . . joint; 30 . . . pump; 30*m* . . . main agent pump; 30*h* . . . curing agent pump; 40 . . . color change valve (CCV); 40*m* . . . main agent color change valve; 40*h* . . . curing agent color change valve; F1, F2, F3, F4 . . . flow meter; FP1*a*, FP1*b*-FP6*a*, FP6*b* . . . flow meter; Fm, Fh . . . flow meter.

What is claimed is:

1. A coating device comprising:

a paint output part outputting paint towards a coating object;

a pipe for the paint to flow, the pipe comprising:

an introduction pipe for introducing the paint into inside of the paint output part;

flow meters being arranged outside of the pipe and measuring a flow rate of the paint in the pipe; and a determination part determining whether a state of the paint is normal based on a measurement result of the flow meters;

wherein the flow meters comprise a first flow meter arranged at an upstream side and a second flow meter arranged at a downstream side of a connection element connected to the introduction pipe; and wherein the connection element comprises a pump that sends out the paint to the paint output part.

2. The coating device of claim 1, wherein the paint output part comprises:

an air motor being connected to the introduction pipe and rotated by air; and a valve being connected to the introduction pipe and switching whether to supply the paint to the air motor;

wherein the flow meters further comprise a third flow meter arranged between the air motor and the valve, and a fourth flow meter arranged between the valve and a rear plate of the paint output part; and wherein the determination part determines whether the flow rate of the paint is normal based on a comparison result of a measurement result of the third flow meter and the measurement result of the fourth flow meter.

3. The coating device of claim 1, wherein the determination part determines whether the flow rate of the paint is normal based on a comparison result of a measurement result of the first flow meter arranged at the upstream side and another measurement result of the second flow meter arranged at the downstream side.

4. The coating device of claim 1, wherein the coating device is provided with an air motor, the air motor being connected to the introduction pipe and rotated by air, and wherein the connection element further comprises a valve that switches open and closed based on whether to supply the paint to the air motor.

5. The coating device of claim 1, wherein the connection element further comprises a joint that joins the introduction pipe and the paint output part.

6. The coating device of claim 1, wherein the pipe further comprises a connection pipe, the connection pipe being connected to the introduction pipe via a color change valve and is provided per color of the paint.

7. The coating device of claim 6, wherein the flow meters further comprise a fifth flow meter arranged at an upstream side and a sixth flow meter arranged at a downstream side of the color change valve connected to the connection pipe, and the fifth flow meter and the sixth flow meter are arranged outside of the connection pipe, and wherein the determination part determines whether the flow rate of the paint is normal based on one or both of a measurement result of the fifth flow meter arranged at the upstream side of the connection pipe and another measurement result of the sixth flow meter arranged at the downstream side of the connection pipe.

8. The coating device of claim 1, wherein the paint is a main agent, a curing agent, and a mixture of the main agent and the curing agent, wherein the pipe further comprises:

a main agent pipe for the main agent to flow; and a curing agent pipe for the curing agent to flow, wherein the introduction pipe, the main agent pipe, and the curing agent pipe are connected, and wherein the flow meters further comprise:

a seventh flow meter arranged outside of the main agent pipe and an eighth flow meter arranged outside of the curing agent pipe.

9. The coating device of claim 8, wherein the determination part determines whether a mixing ratio of the main agent and the curing agent in the paint is normal based on a measurement result of the seventh flow meter arranged outside of the main agent pipe and a measurement result of the eighth flow meter arranged outside of the curing agent pipe.

10. The coating device of claim 8, wherein the flow meters detect a flow direction of the paint.

11. The coating device of claim 8, wherein the determination part determines whether the flow rate of the paint is normal based on a comparison result of a measurement result of the seventh flow meter arranged outside of the main agent pipe and a set value of the flow rate of the paint in the main agent pipe.

12. The coating device of claim 8, wherein the determination part determines whether the flow rate of the paint is normal based on a comparison result of a measurement result of the eighth flow meter arranged outside of the curing agent pipe and a set value of the flow rate of the paint in the curing agent pipe.

* * * * *